(12) United States Patent
Hosoya et al.

(10) Patent No.: US 11,988,263 B2
(45) Date of Patent: May 21, 2024

(54) DAMPER DEVICE

(71) Applicant: PIOLAX, INC., Kanagawa (JP)

(72) Inventors: Tomoyuki Hosoya, Kanagawa (JP); Jun Saito, Kanagawa (JP)

(73) Assignee: PIOLAX, INC., Kanagawa (JP)

(*) Notice: Subject to any disclaimer, the term of this patent is extended or adjusted under 35 U.S.C. 154(b) by 67 days.

(21) Appl. No.: 17/611,789

(22) PCT Filed: Apr. 2, 2020

(86) PCT No.: PCT/JP2020/015235
§ 371 (c)(1),
(2) Date: Nov. 16, 2021

(87) PCT Pub. No.: WO2020/241045
PCT Pub. Date: Dec. 3, 2020

(65) Prior Publication Data
US 2022/0235843 A1    Jul. 28, 2022

(30) Foreign Application Priority Data

May 28, 2019   (JP) ................. 2019-099405

(51) Int. Cl.
F16F 9/12     (2006.01)
F16H 57/00    (2012.01)

(52) U.S. Cl.
CPC ............ F16F 9/12 (2013.01); F16H 57/0006 (2013.01)

(58) Field of Classification Search
CPC ..... F16F 9/12; F16H 57/0006; B60G 2202/22
USPC ................................. 188/290, 296
See application file for complete search history.

(56) References Cited

U.S. PATENT DOCUMENTS

| 3,865,216 A |   | 2/1975  | Gryglas  |           |
|-------------|---|---------|----------|-----------|
| 4,691,589 A | * | 9/1987  | Arakawa  | F16H 55/14 |
|             |   |         |          | 464/180   |
| 4,697,673 A | * | 10/1987 | Omata    | F16F 7/06 |
|             |   |         |          | 267/155   |
| 5,301,775 A | * | 4/1994  | Nedbal   | F16F 9/12 |
|             |   |         |          | 188/290   |
| 5,497,863 A | * | 3/1996  | Schmidt  | F16F 9/12 |
|             |   |         |          | 188/306   |

(Continued)

FOREIGN PATENT DOCUMENTS

| JP | S50-061583 A | 5/1975 |
| JP | S61-133134 A | 8/1986 |

(Continued)

OTHER PUBLICATIONS

Jun. 16, 2020, International Search Report issued for related PCT application No. PCT/JP2020/015235.

(Continued)

Primary Examiner — Thomas W Irvin
(74) Attorney, Agent, or Firm — Paratus Law Group, PLLC

(57) ABSTRACT

There is provided a damper device, including: a base; a rotor rotatably supported by the base; a cap defining a housing chamber of the rotor together with the base; and viscous liquid filled in the housing chamber. The base and the cap define a reservoir chamber for the viscous liquid on an outer side of the housing chamber in a radial direction. A gap between the housing chamber and the reservoir chamber is sealed.

6 Claims, 15 Drawing Sheets

(56) References Cited

U.S. PATENT DOCUMENTS

| | | | | |
|---|---|---|---|---|
| 5,522,485 A * | 6/1996 | Takahashi | | F16F 9/12 188/290 |
| 5,660,254 A * | 8/1997 | Spoto | | F16F 7/02 188/290 |
| 5,718,309 A * | 2/1998 | Kariya | | F16F 9/12 188/290 |
| 5,984,057 A * | 11/1999 | Nash | | F16F 9/12 188/293 |
| 6,968,929 B2 * | 11/2005 | Doornbos | | F16F 9/12 188/290 |
| 7,357,230 B2 * | 4/2008 | Kojima | | B60N 2/305 188/290 |
| 7,364,023 B2 * | 4/2008 | Cultraro | | F16F 9/12 188/290 |
| 7,424,939 B2 * | 9/2008 | Hayashi | | F16F 9/12 188/290 |
| 7,604,100 B2 * | 10/2009 | Hayashi | | F16F 9/12 188/290 |
| 7,938,238 B2 * | 5/2011 | Koizumi | | F16F 9/12 188/290 |
| 8,042,660 B2 * | 10/2011 | Cultraro | | E05F 3/14 188/293 |
| 9,297,195 B2 * | 3/2016 | Berry, Jr. | | F16F 9/12 |
| 10,267,375 B2 * | 4/2019 | Muranaka | | F16F 9/12 |
| 2004/0155392 A1 * | 8/2004 | Doornbos | | F16F 9/12 267/290 |
| 2005/0045439 A1 * | 3/2005 | Nishiyama | | F16F 9/12 188/290 |
| 2006/0113154 A1 * | 6/2006 | Hayashi | | F16F 9/12 188/290 |
| 2007/0158152 A1 * | 7/2007 | Cultraro | | E05F 3/14 188/290 |
| 2008/0202873 A1 * | 8/2008 | Hayashi | | F16F 9/12 188/290 |
| 2009/0064455 A1 * | 3/2009 | Cultraro | | F16F 9/12 16/84 |
| 2009/0277735 A1 * | 11/2009 | Yamaguchi | | F16F 9/12 188/290 |
| 2013/0153347 A1 * | 6/2013 | Oda | | F16J 15/3284 188/290 |
| 2017/0261059 A1 | 9/2017 | Muranaka | | |
| 2017/0343073 A1 | 11/2017 | Muranaka | | |

FOREIGN PATENT DOCUMENTS

| | | |
|---|---|---|
| JP | H10-115337 A | 5/1998 |
| JP | 2016-102524 A | 6/2016 |
| JP | 2016-114183 A | 6/2016 |

OTHER PUBLICATIONS

Jun. 16, 2020, International Search Opinion issued for related PCT application No. PCT/JP2020/015235.

Apr. 27, 2021, PCT/IPEA/409 issued for related PCT application No. PCT/JP2020/015235.

* cited by examiner (a)

(b)

(a)

(b)

DAMPER DEVICE

CROSS REFERENCE TO PRIOR APPLICATION

This application is a National Stage Patent Application of PCT International Patent Application No. PCT/JP2020/015235 (filed on Apr. 2, 2020) under 35 U.S.C. § 371, which claims priority to Japanese Patent Application No. 2019-099405 (filed on May 28, 2019), which are all hereby incorporated by reference in their entirety.

TECHNICAL FIELD

The present invention relates to a damper device filled with viscous liquid.

BACKGROUND ART

Patent Literature 1 discloses a damper including a rotatable rotor, a housing and a cap for housing the rotor, a damping medium filled in a rotation region of the rotor, and a sealing portion provided outside the rotation region of the rotor and communicating with the rotation region. The housing and the cap have a plurality of annular protrusions, and the rotor has a plurality of annular rotor protrusions protruding upward and downward. The rotor protrusion is fitted into a gap between the annular protrusions of the housing and the cap.

CITATION LIST

Patent Literature

Patent Literature 1: JP-A-2016-102524

SUMMARY OF INVENTION

Technical Problem

In the technique disclosed in Patent Literature 1, gas present in the sealing portion may move to the gaps around the annular protrusion to reduce a damping force.

An object of the present invention is to provide a damper device capable of stably generating a damping force.

Solution To Problem

In order to solve the above problems, a damper device according to a certain aspect of the present invention includes: a base, a rotor rotatably supported by the base; a cap defining a housing chamber of the rotor together with the base; and viscous liquid filled in the housing chamber. The base and the cap define a reservoir chamber for the viscous liquid on an outer side of the housing chamber in a radial direction, and a gap between the housing chamber and the reservoir chamber is sealed.

Advantageous Effects of Invention

According to the present invention, it is possible to provide a damper device capable of stably generating a damping force.

DESCRIPTION OF EMBODIMENTS

Figure 1:
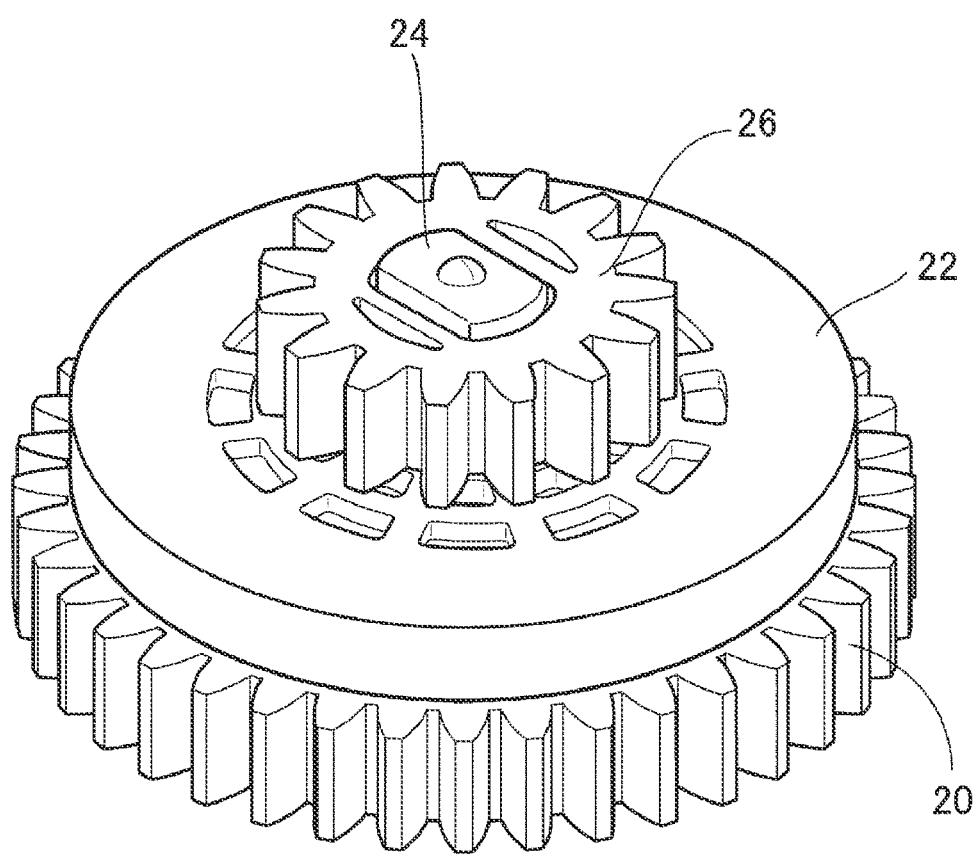
FIG. 1 is a perspective view of a damper device according to an embodiment.

FIG. 1 is a perspective view of a damper device 10 according to an embodiment. The damper device 10 is attached to, for example, a glove box of a vehicle, and applies a damping force to an opening and closing operation of an opening and closing body (lid member) of the glove box. Further, the damper device 10 may be attached to a console box of the vehicle, and may apply a damping force to opening and closing of an opening and closing body of the console box. In any case, the damper device 10 is attached to the fixed body and the opening and closing body that opens and closes an opening of the fixed body.

The damper device 10 includes a base 20, a cap 22, a rotor 24, a coupling gear 26, a seal ring (not shown), and viscous liquid (not shown). The viscous liquid is filled between the base 20 and the cap 22, and applies viscous resistance to rotation of the rotor 24. The viscous liquid is, for example, oil such as grease, and is filled so as not to leak from between the base 20 and the cap 22.

The base 20 is coupled to one of the fixed body and the opening and closing body, and the coupling gear 26 is coupled to the other of the fixed body and the opening and closing body. For example, the coupling gear 26 is coupled to the opening and closing body via a rack gear and the like, rotates in accordance with movement of the opening and closing body, and the base 20 is coupled to the fixed body. The rotor 24 rotates together with the coupling gear 26, receives a resistance force from the viscous liquid, and generates a damping force, An aspect of use of the damper device 10 is not limited to an aspect in which the base 20 is disposed on a lower side and the coupling gear 26 is disposed on an upper side as shown in FIG. 1, and the damper device 10 may be used in a state where a rotation axis of the rotor 24 is inclined with respect to a vertical direction.

Figure 2:
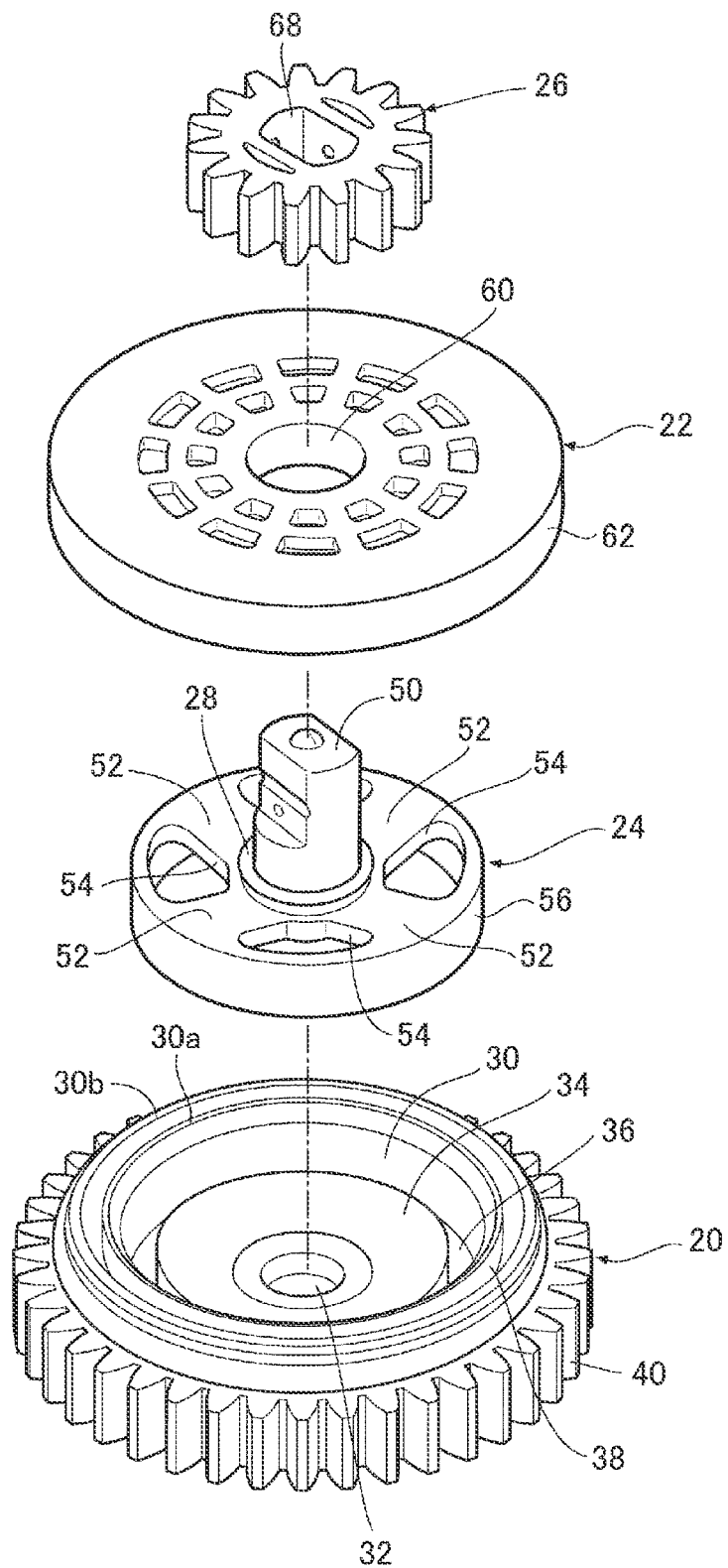
FIG. 2 is an exploded view of the damper device according to the embodiment.
Figure 3:
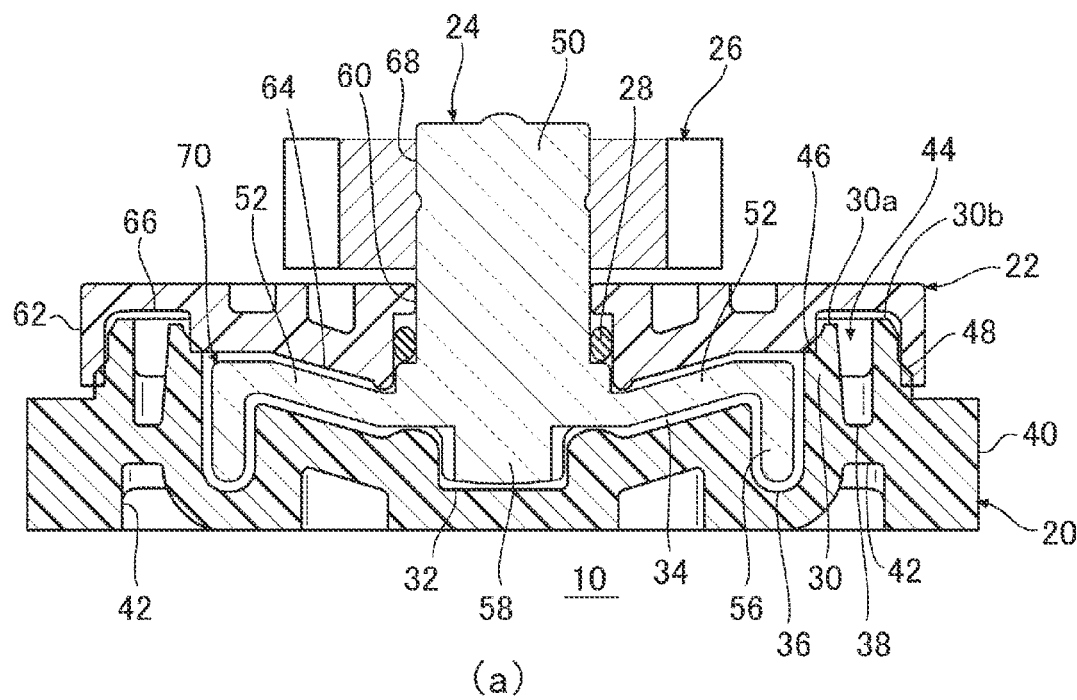
FIG. 3 is a cross-sectional view of the damper device according to the embodiment.
Figure 3:
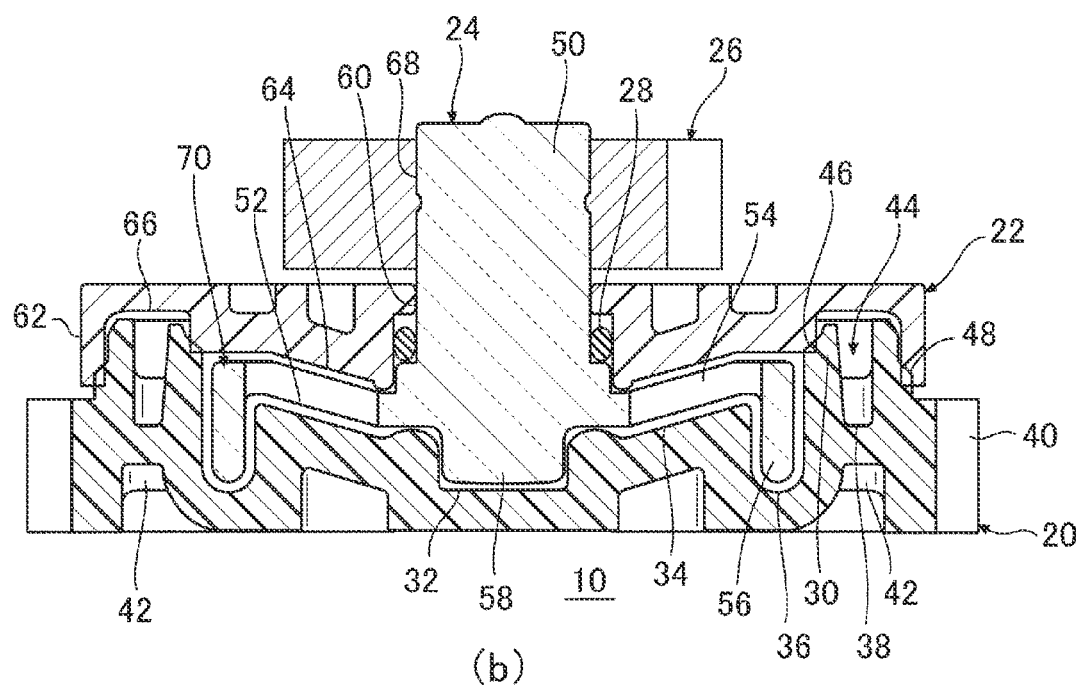

FIG. 2 is an exploded view of the damper device 10. Further, FIG. 3 is a cross-sectional view of the damper device 10. Both of the cross-sectional views of the damper device 10 shown in (a) of FIG. 3 and (b) of FIG. 3 are taken along an axial direction, but rotational positions are different. FIGS. 2 and 3 show a state where the viscous liquid is not filled.

The base 20 includes a peripheral wall portion 30, a recessed portion 32, a base inclined surface 34, an annular groove portion 36, an annular recessed portion 38, tooth portions 40, and a coupling hole portion 42. The cap 22 includes an insertion hole 60, an outer peripheral wall portion 62, a cap inclined surface 64, and an inner peripheral groove portion 66. The rotor 24 includes a rotation shaft portion 50, an inclined portion 52, a through hole portion 54, an annular wall portion 56, and a protruding portion 58. The coupling gear 26 has a coupling hole 68.

The base 20 is formed in a bottomed cylindrical shape. The recessed portion 32, the base inclined surface 34, and the annular groove portion 36 are formed in a bottom portion of the base 20. The recessed portion 32 is formed to be recessed in a cylindrical shape at a center of the base 20. In an assembly process, a large amount of viscous liquid can be easily placed on the recessed portion 32.

The base inclined surface 34 is formed on an inner surface of the base 20, is inclined so as to rise outward in a radial direction from the recessed portion 32, and is inclined with respect to a plane orthogonal to the axial direction. That is, the base inclined surface 34 extends in a direction away from the bottom surface of the base 20 outward in the radial direction. The base inclined surface 34 is formed in a conical shape recessed from an inner edge of the annular groove portion 36 toward the recessed portion 32.

The annular groove portion 36 is continuously provided on an outer side of the base inclined surface 34 in the radial direction, and is formed to be recessed in an annular shape. The annular groove portion 36 guides the rotation of the rotor 24. The peripheral wall portion 30 is formed so as to be continuous with the annular groove portion 36 and to be erected on an outer periphery of the base 20. The tooth portions 40 are formed on an outer peripheral surface of the peripheral wall portion 30. The tooth portions 40 engage with, for example, a fixed body to restrict the rotation of the base 20.

The annular recessed portion 38 is formed by recessing an upper end portion of the peripheral wall portion 30, and is formed in an annular shape along the peripheral wall portion 30. Remaining viscous liquid is housed in the annular recessed portion 38. The peripheral wall portion 30 includes an inner wall portion 30*a* and an outer wall portion 30*b* that sandwich the annular recessed portion 38 in the radial direction. The inner wall portion 30*a* is set to have a height lower than that of the outer wall portion 30*b* in the axial direction. Accordingly, it is difficult for the viscous liquid to move to an outer diameter side from the outer wall portion 30*b*. A tip end side of the inner wall portion 30*a* is inclined in a tapered shape so as to rise outward in the radial direction.

The coupling hole portion 42 is formed in an annular shape on a lower surface of the base 20, and is engaged with a protrusion formed on a pedestal to which the damper device 10 is attached. Accordingly, the damper device 10 can be stably attached. Further, by forming the coupling hole portion 42 not on a center side but on an outer side of the annular groove portion 36 in the radial direction and providing the coupling hole portion 42 at a position overlapping with the reservoir chamber 44 when viewed in the axial direction of a reservoir chamber 44, it is possible to suppress an increase in a height of the base 20 in the axial direction.

The rotation shall portion 50 of the rotor 24 is erected at a center of the rotor 24 and is formed in a columnar shape. The rotor 24 rotates around an axis of the rotation shaft portion 50. A flat surface to be fitted to the coupling gear 26 is formed on a side surface on a tip end side of the rotation shall portion 50. The inclined portions 52 protrude outward in the radial direction from the rotation shaft portion 50 and are formed at equal intervals in a peripheral direction. As shown in FIG. 2, the through hole portion 54 is formed between adjacent inclined portions 52. The inclined portion 52 extends so as to rise outward in the radial direction from the rotation shaft portion 50, and is inclined along the base inclined surface 34 as shown in (a) of FIG. 3. The inclined portion 52 is inclined with respect to a plane orthogonal to the rotation shaft portion 50, and is inclined outward in the radial direction and upward in the axial direction. The inclined portion 52 and the through hole portion 54 have the same length in the radial direction.

The annular wall portion 56 is formed in a cylindrical shape, is located on an outer side of the plurality of inclined portions 52 in the radial direction, and is suspended from an outer peripheral edge of the inclined portions 52. The annular wall portion 56 fits into and engages with the annular groove portion 36 of the base 20, and stabilizes the rotation of the rotor 24.

The protruding portion 58 is formed in a columnar shape such that the rotation shaft portion 50 protrudes downward, and is coaxial with the rotation shaft portion 50. An axial groove for securing a movement path of gas is formed on an outer peripheral surface of the protruding portion 58. The rotation of the rotor 24 can be stabilized by the protruding portion 58 being fitted into and engaged with the recessed portion 32.

The cap 22 defines a housing chamber 70 of the rotor 24 together with the base 20 with the rotor 24 sandwiched between the cap 22 and the base 20. The insertion hole 60 is formed at a center of the cap 22, and exposes the rotation shaft portion 50 of the rotor 24 to the outside from the housing chamber 70. The rotation shaft portion 50 is inserted into the insertion hole 60. The outer peripheral wall portion 62 is formed in a cylindrical shape on an outer periphery of the cap 22.

The inner peripheral groove portion 66 is formed on an inner side of the outer peripheral wall portion 62, receives the peripheral wall portion 30 of the base 20, and is joined to the peripheral wall portion 30. The inner peripheral groove portion 66 faces the annular recessed portion 38 of the base 20. Although the joining method will be described later, a first seal portion 46 and a second seal portion 48 are formed by welding. The first seal portion 46 and the second seal portion 48 in (a) of FIG. 3 and (h) of FIG. 3 are shown in a state where the base 20 and the cap 22 in seal portions overlap with each other and are not melted.

The first seal portion 46 is formed on an inner peripheral surface of the peripheral wall portion 30, and the second seal portion 48 is formed on the outer peripheral surface of the peripheral wall portion 30. The reservoir chamber 44 is formed on an outer side of the housing chamber 70 in the radial direction by closing with the first seal portion 46 and the second seal portion 48. The base 20 and the cap 22 define the reservoir chamber 44 of the viscous liquid on the outer side of the housing chamber 70 in the radial direction. The reservoir chamber 44 is formed by the peripheral wall portion 30 of the base 20 and the inner peripheral groove portion 66 of the cap 22, and a volume of the reservoir chamber 44 is secured by the annular recessed portion 38. The reservoir chamber 44 is formed along the peripheral direction, and houses the viscous liquid discharged from the housing chamber 70. The housing chamber 70 side is filled with sufficient viscous liquid, and the remaining viscous liquid is housed in the reservoir chamber 44.

The cap inclined surface 64 is formed on an inner surface of the cap 22, is inclined so as to be lowered inward in the radial direction, and is inclined with respect to a plane orthogonal to the axial direction. The cap inclined surface 64 is formed along and parallel to the inclined portion 52 and the base inclined surface 34. The inclined portion 52 of the rotor 24 is sandwiched by the base inclined surface 34 and the cap inclined surface 64. The inclined portion 52 is located in a region in the housing chamber 70 formed by the base inclined surface 34 and the cap inclined surface 64. That is, the base inclined surface 34 faces a lower surface of the inclined portion 52, the cap inclined surface 64 faces an upper surface of the inclined portion 52, and the base inclined surface 34, the inclined portion 52, and the cap inclined surface 64 overlap with each other when viewed in the axial direction. Accordingly, the housing chamber 70 is formed so as to rise outward in the radial direction from a position of the rotation shaft portion 50.

The seal ring 28 surrounds the rotation shaft portion 50, abuts on an outer peripheral surface of the rotation shaft portion 50 and an inner peripheral surface of the insertion hole 60, and suppresses leakage of the viscous liquid in the housing chamber 70 through the insertion hole 60.

Figure 4:
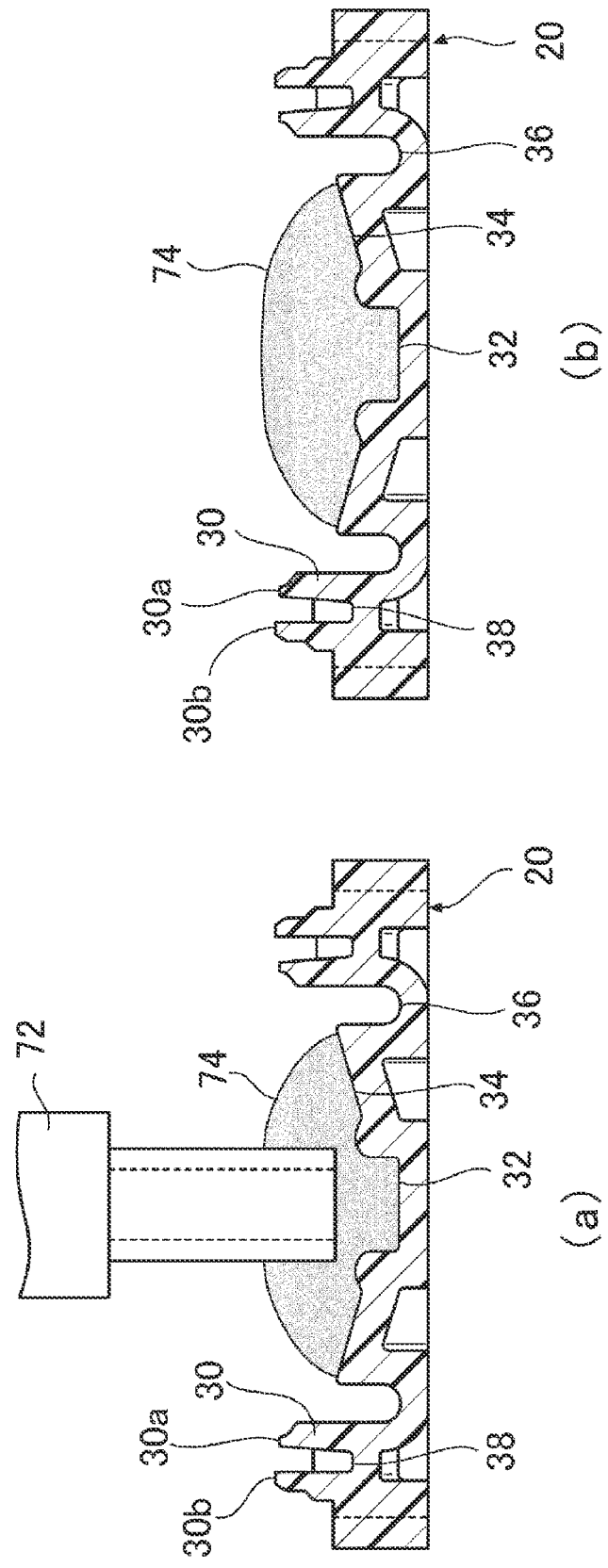
FIG. 4 is a diagram showing arm assembly process of the damper device according to the embodiment.

FIG. 4 is a diagram showing an assembly process of the damper device 10. As shown in (a) of FIG. 4, a discharge port of a discharge device 72 is aligned with a center position of the base 20, and the discharge device 72 discharges viscous liquid 74. As shown in (b) of FIG. 4, the viscous liquid 74 is placed on the center of the base 20, and is discharged more than a necessary amount into the housing chamber 70. A larger amount of the viscous liquid 74 is easily placed on the base 20 by the recessed portion 32.

Figure 5:
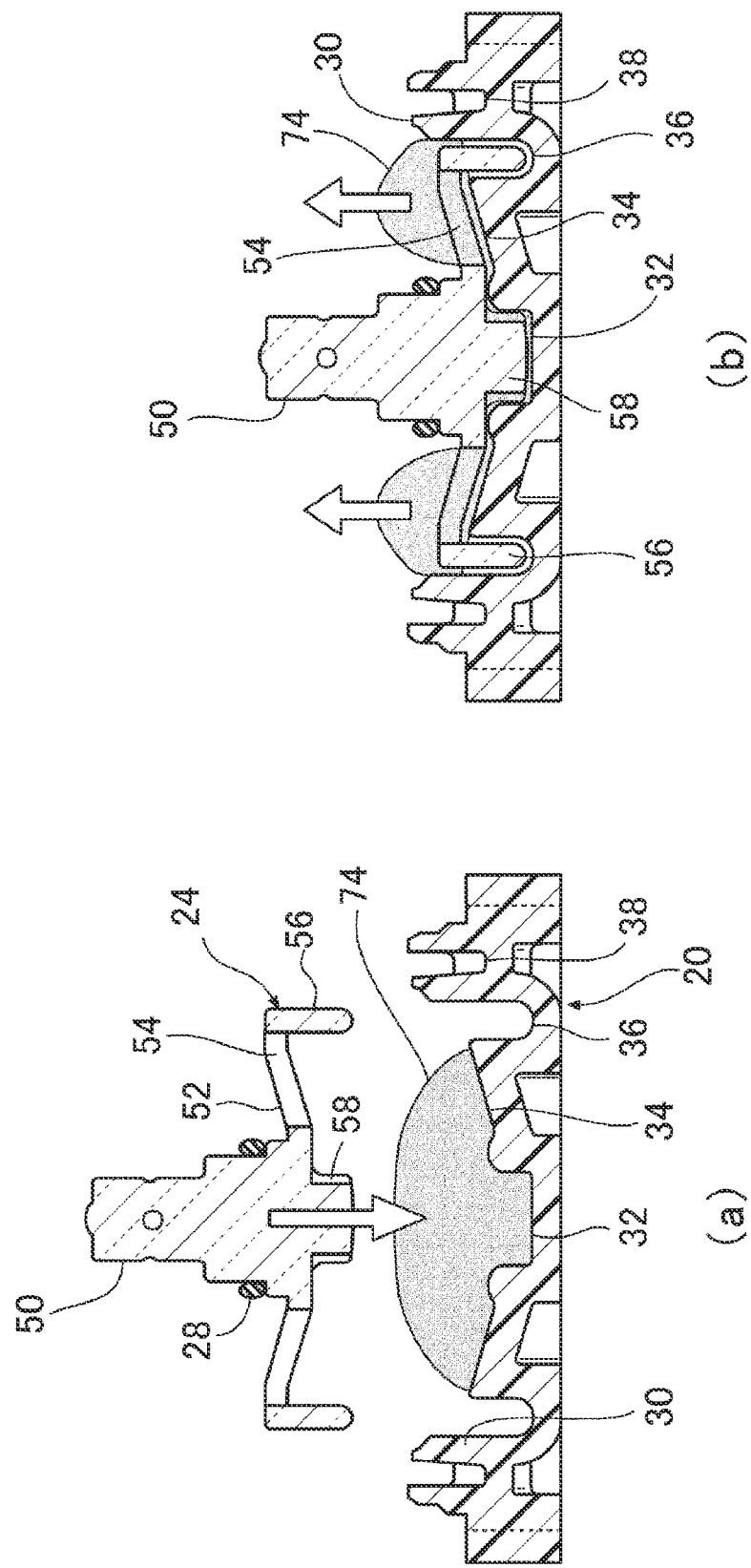
FIG. 5 is a diagram showing a continuation of the assembly process of the damper device of FIG. 4.

FIG. 5 is a diagram showing a continuation of the assembly process of the damper device 10 of FIG. 4. As shown in (a) of FIG. 5, the rotor 24 approaches the base 20 from above, and is placed on the base 20 as shown in (b) of FIG. 5. When the rotor 24 approaches the base 20, the protruding portion 58 enters the recessed portion 32 to push the viscous liquid 74, and the viscous liquid 74 protrudes upward from the through hole portion 54 to be in a raised state.

The protruding portion 58 of the rotor 24 is accommodated in and engaged with the recessed portion 32 of the base 20. When the recessed and protruding relationship between the base 20 and the rotor 24 is reversed, gas may remain in the recessed portion of the rotor 24, but the formation of the protruding portion 58 on the rotor 24 can suppress reservoir of the gas. Further, since the base inclined surface 34 is formed so as to rise along the inclined portion 52 of the rotor 24, the gas on a center side can be guided to the outer side in the radial direction.

Figure 6:
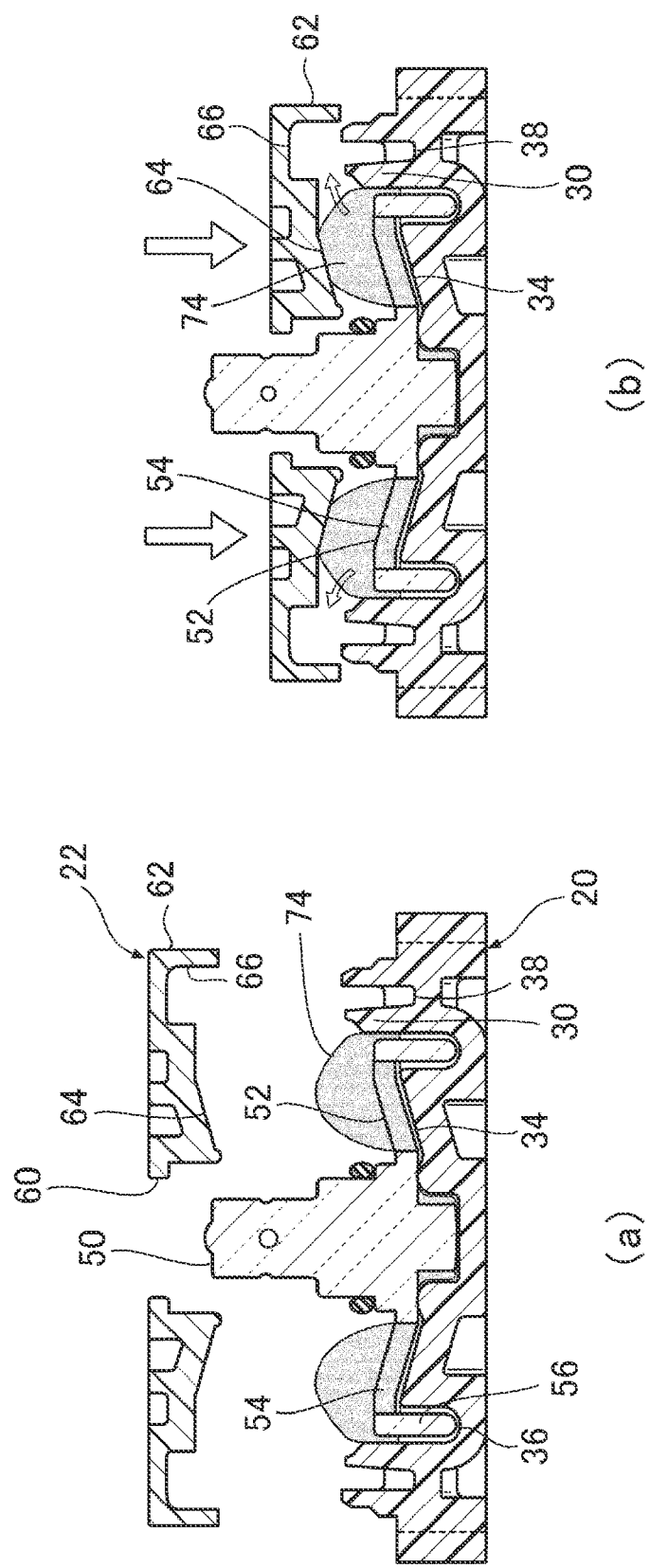
FIG. 6 is a diagram showing a continuation of the assembly process of the damper device of FIG. 5.

FIG. 6 is a diagram showing a continuation of the assembly process of the damper device 10 of FIG. 5. As shown in (a) of FIG. 6, the cap 22 approaches the base 20 side from above, and as shown in (b) of FIG. 6, the cap inclined surface 64 comes into contact with the raised viscous liquid 74 and pushes and spreads the viscous liquid 74. The viscous liquid 74 and the gas are guided by the cap inclined surface 64 and the inclined portion 52, spread in the radial direction, and are guided toward the annular recessed portion 38 by the inclination. Since the cap inclined surface 64 and the inclined portion 52 are inclined so as to rise outward in the radial direction, the gas in the housing chamber 70 is easily pushed outward in the radial direction.

Figure 7:
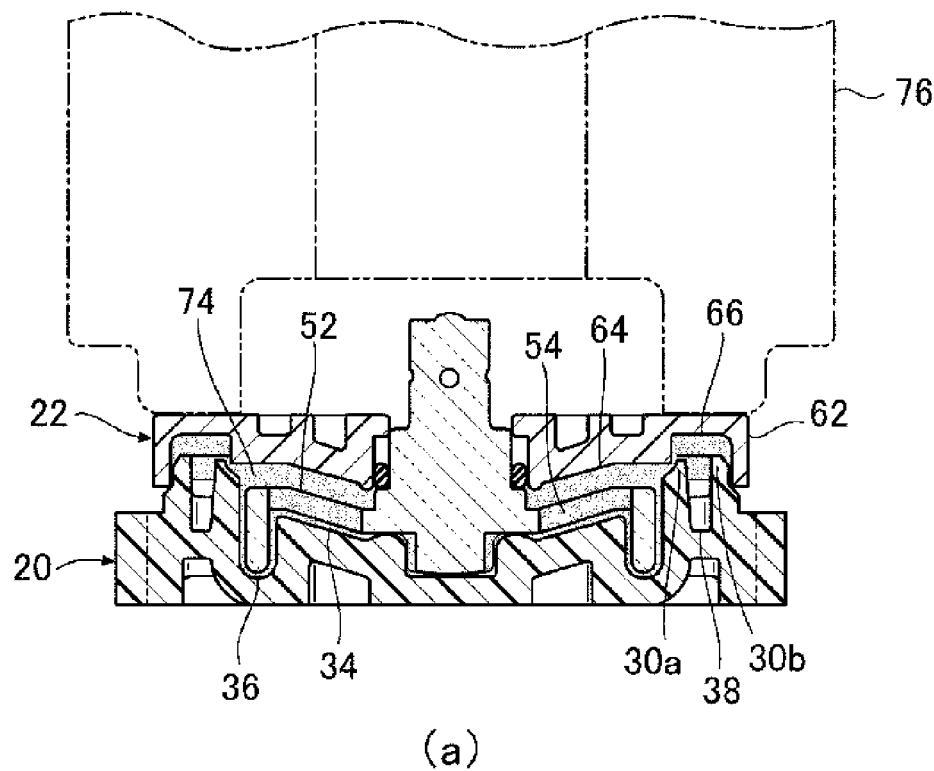
FIG. 7 is a diagram showing a continuation of the assembly process of the damper device of FIG. 6.
Figure 7:
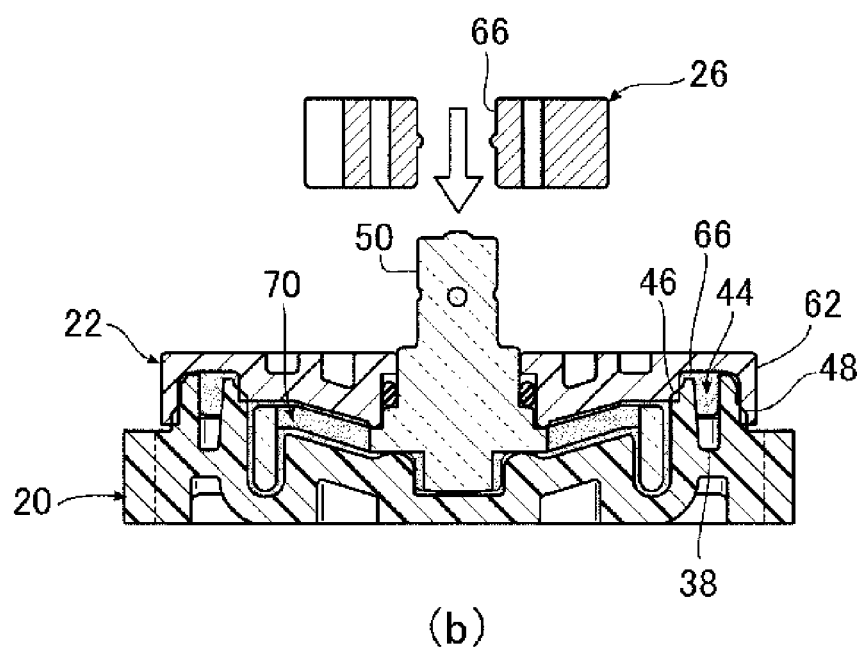

FIG. 7 is a diagram showing a continuation of the assembly process of the damper device 10 of FIG. 6. As shown in (a) of FIG. 7, when the cap 22 approaches the base 20, a tip end of the outer peripheral wall portion 62 abuts on the outer wall portion 30b, and the approach is stopped. At this time, the viscous liquid 74 is pushed by the cap 22 and spreads to the annular groove portion 36 and the annular recessed portion 38.

In a state where the tip end of the outer peripheral wall portion 62 and the outer wall portion 30b abut on each other, an ultrasonic welding device 76 is driven, an abutting portion is melted to make the approach possible, the cap 22 is pushed to further approach the base 20, and an inner peripheral edge of the inner peripheral groove portion 66 abuts on the inner wall portion 30a. The second seal portion 48 is formed by melting the abutting portion between the tip end of the outer peripheral wall portion 62 and the outer wall portion 30b, and it is possible to suppress the viscous liquid 74 from leaking to the outside of the damper device 10.

While the abutting portion between the tip end of the outer peripheral wall portion 62 and the outer wall portion 30b is melted, an abutting portion between the inner peripheral edge of the inner peripheral groove portion 66 and the inner wall portion 30a starts to be melted by the ultrasonic welding device 76, and the first seal portion 46 is formed. As shown in (b) of FIG. 7, the communication between the housing chamber 70 and the reservoir chamber 44 is blocked by the first seal portion 46. The first seal portion 46 seals between the housing chamber 70 and the reservoir chamber 44. Accordingly, it is possible to restrict the return of the gas to the housing chamber 70 after the gas is pushed into the reservoir chamber 44, and it is possible to suppress that the viscous resistance generated during the rotation of the rotor 24 cannot be stably exhibited due to the reservoir of air bubbles in the housing chamber 70. The reservoir chamber 44 is closed with respect to the outside by the second seal portion 48 on an outer side of the reservoir chamber 44 in the radial direction, and leakage of the viscous liquid 74 to the outside is suppressed.

As shown in (b) of FIG. 7, after the base 20 and the cap 22 are fixed, the coupling gear 26 is mounted on the rotation shaft portion 50, and the assembly process of the damper device 10 is completed.

Figure 8:
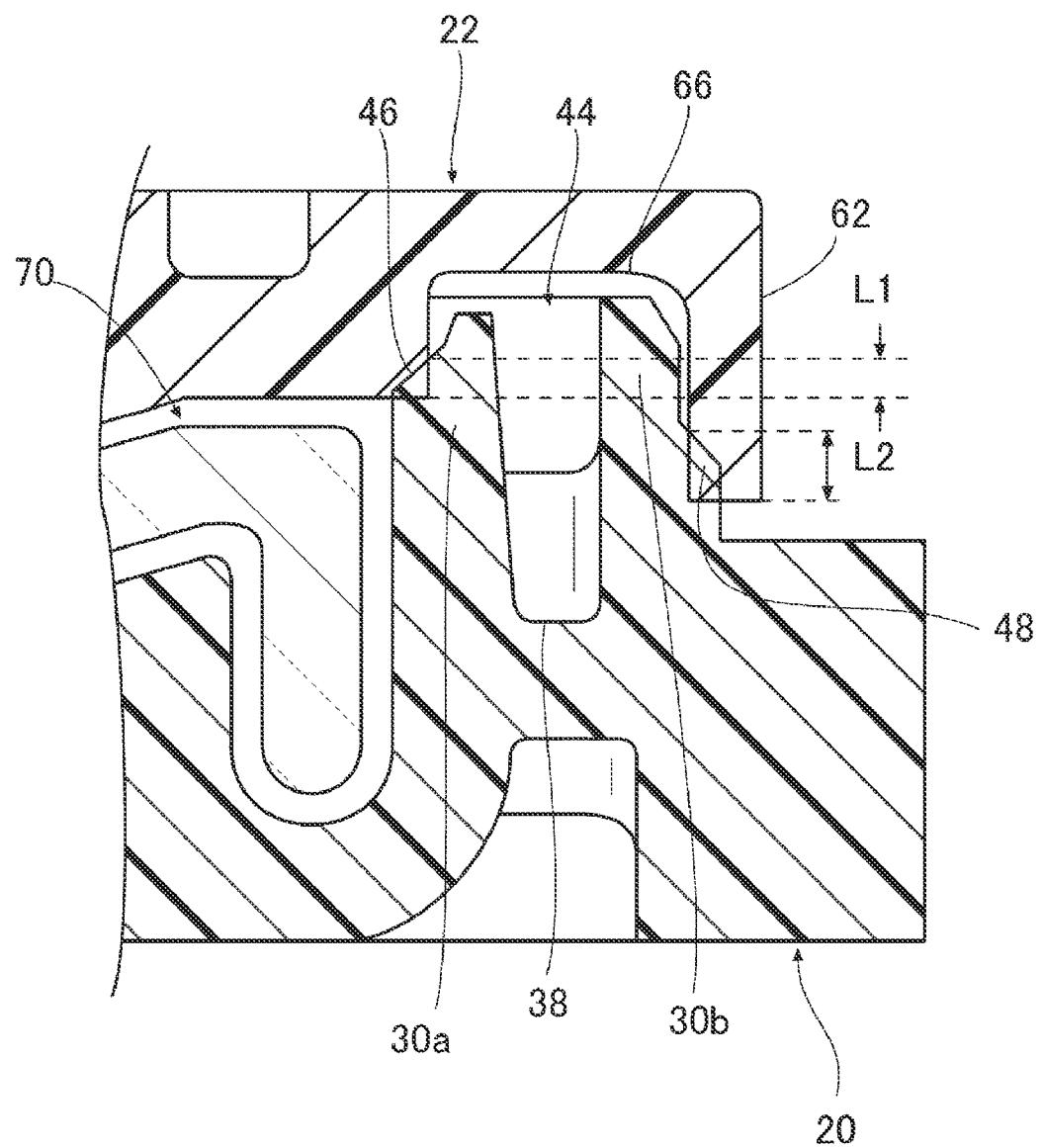
FIG. 8 is a partial cross-sectional view of the damper device.

FIG. 8 is a partial cross-sectional view of the damper device 10. In FIG. 8, a portion where the first seal portion 46 and the second seal portion 48 are formed is shown in a state where the base 20 and the cap 22 overlap with each other, but actually, the overlapping portions are melted and joined.

As described in the assembly process, the second seal portion 48 is melted prior to the first seal portion 46 and starts to be welded. Since the second seal portion 48 is formed prior to the first seal portion 46, a seal margin L2 of the second seal portion 48 is formed to be larger than a seal margin L1 of the first seal portion 46 and to be longer in the axial direction. The first seal portion 46 and the second seal portion 48 are formed in an annular shape, and a length of the first seal portion 46 in the axial direction is the seal margin L1, and a length of the second seal portion 48 in the axial direction is the seal margin L2.

Accordingly, when the cap 22 is pushed to the base 20 side, a path for pushing out the gas from the housing chamber 70 to the reservoir chamber 44 side can be secured until the pushing is completed. That is, the gas can be pushed out from the housing chamber 70 even while the second seal portion 48 is formed. Accordingly, the viscous liquid 74 is filled in the housing chamber 70 at a sufficient filling rate. Further, by starting the formation of the second seal portion 48 first, it is possible to suppress the leakage of the viscous liquid 74 to the outside in a process of pushing in the cap 22.

Further, since the seal margin L1 of the first seal portion 46 is longer than the seal margin L2 of the second seal portion 48, the second seal portion 48 is started to be welded from the middle of welding the first seal portion 46, and the cap 22 is pushed to the base 20 side while both the first seal portion 46 and the second seal portion 48 are melted. Accordingly, the first seal portion 46 and the second seal portion 48 can be formed in one pushing process, and the working efficiency can be improved.

Since the viscous resistance generated during the rotation of the rotor 24 is generated mainly in a region of the annular wall portion 56, it is necessary to secure the lengths of the annular wall portion 56 and the annular groove portion 36 in the axial direction in order to generate a desired damping force. Since the inclined portion 52 is raised, even if the annular wall portion 56 is suspended from the inclined portion 52, it is possible to suppress an increase in a length of the entire damper device 10 in the axial direction. Further, since the reservoir chamber 44 is provided at a position that does not overlap with the annular wall portion 56 when viewed in the axial direction, it is possible to suppress an increase in the length of the damper device 10 in the axial direction while securing the length of the annular wall portion 56 in the axial direction.

Since the reservoir chamber 44 is provided at a position overlapping with the housing chamber 70 when viewed in the radial direction, it is possible to suppress the height of the damper device 10 in the axial direction. The base inclined surface 34 extends to the annular groove portion 36, and is formed such that the entire portion thereof facing the inclined portion 52 and the through hole portion 54 is inclined.

Figure 9:
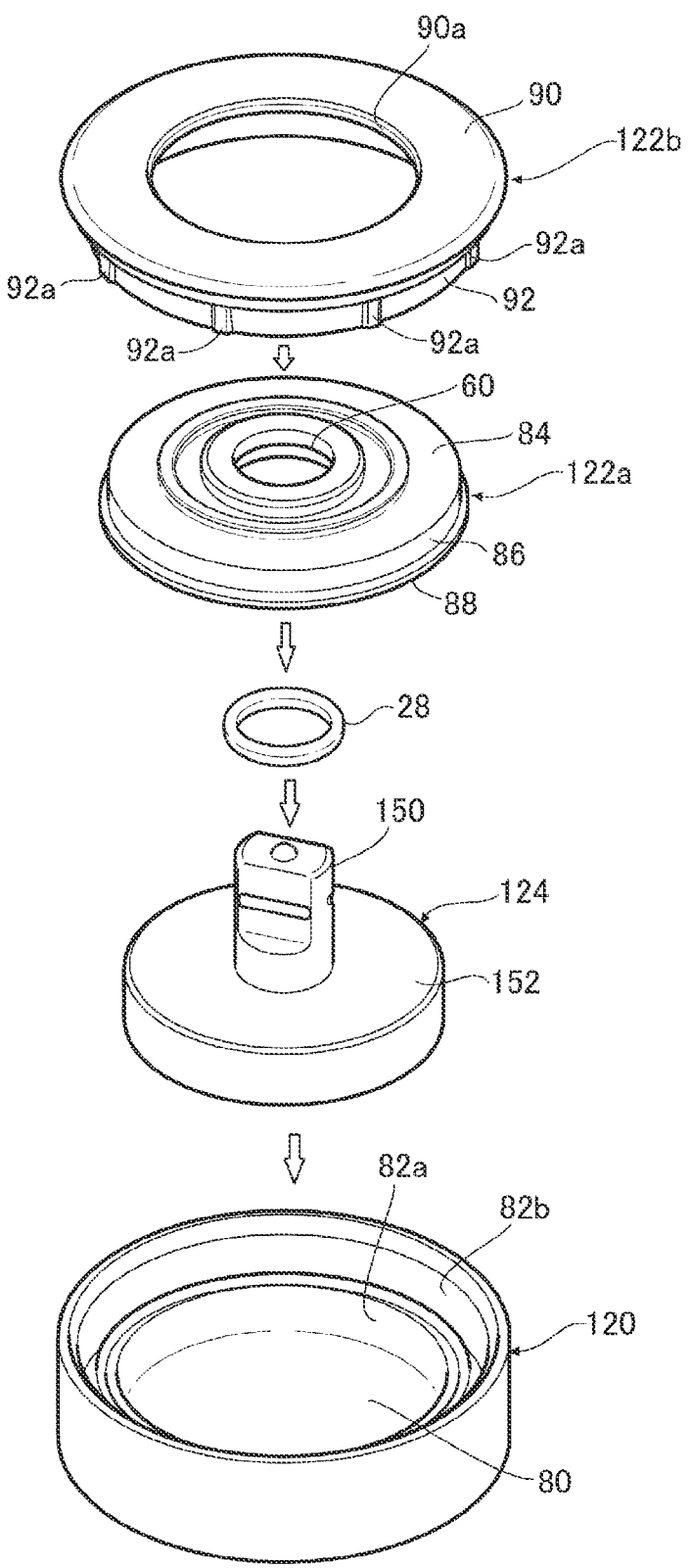
FIG. 9 is an exploded view of a damper device according to a first modification.

FIG. 9 is an exploded view of a damper device according to a first modification. A damper device 100 of the first modification is different from the damper device 10 shown in FIG. 2 mainly in that a cap is divided into two members.

The damper device 100 includes members of a base 120, a first cap 122a, a second cap 122b, a seal ring 28, and a rotor 124. The rotor 124, the seal ring 28, the first cap 122a, and the second cap 122b, with the base 120 as a bottom, are attached in this order from above. The configuration of each member will be described with reference to new drawings.

Figure 10:
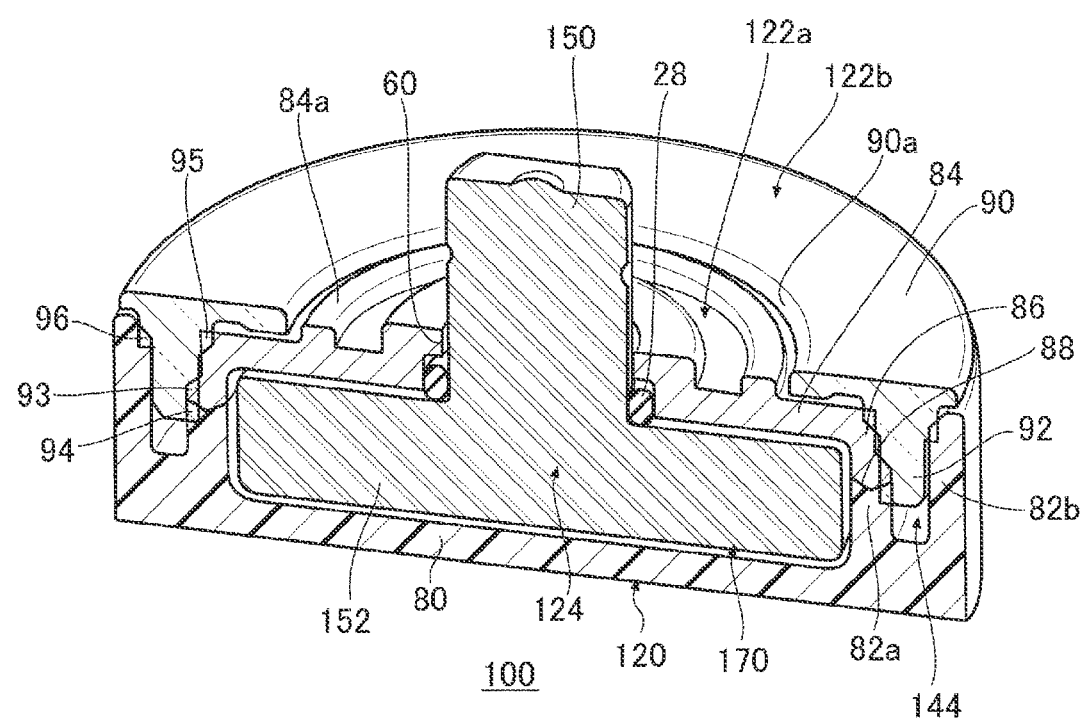
FIG. 10 is a perspective cross-sectional view of the damper device according to the first modification.
Figure 11:
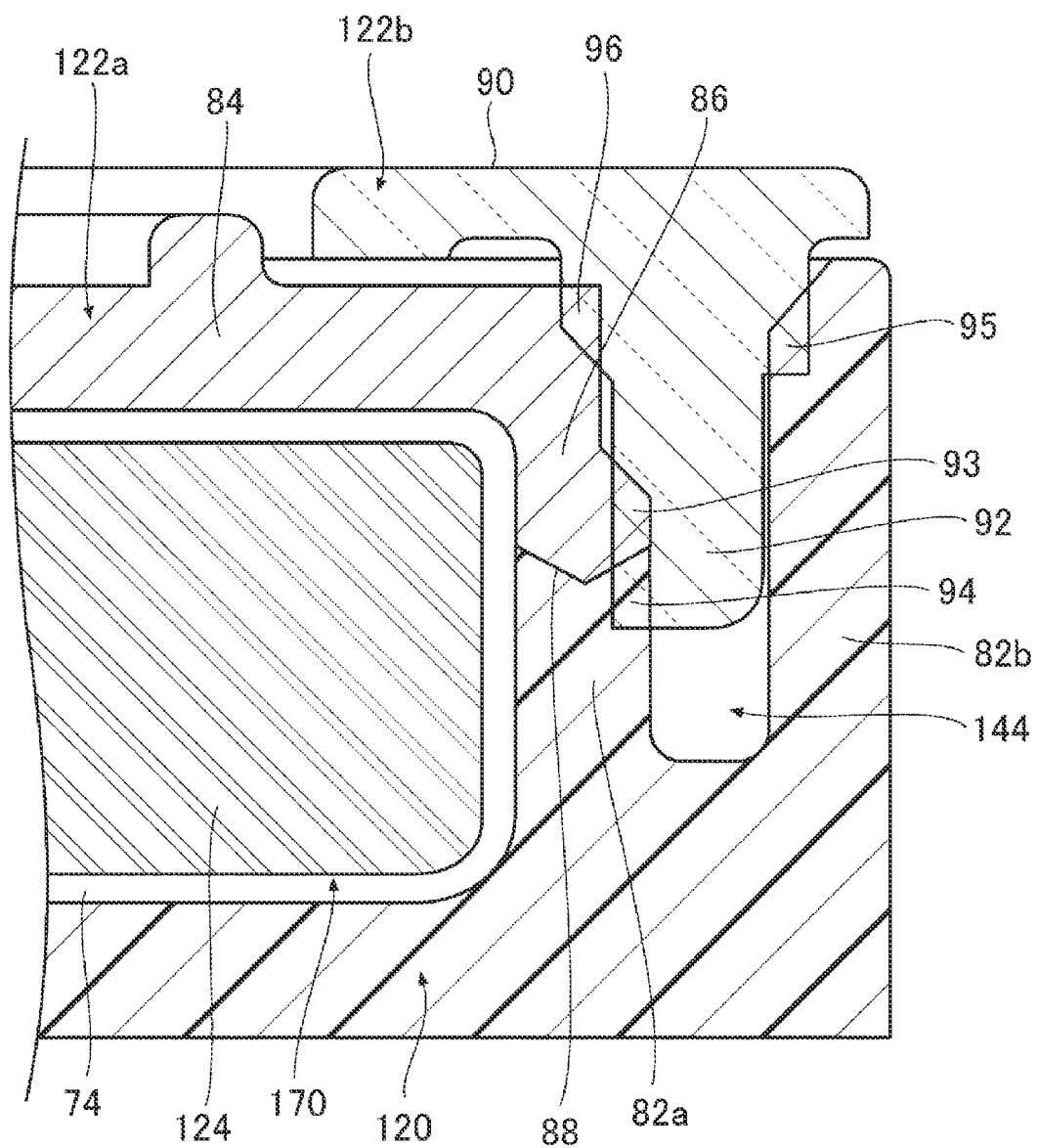
FIG. 11 is a partially enlarged view of the damper device shown in FIG. 10.

FIG. 10 is a perspective cross-sectional view of the damper device 100 according to the first modification. Further, FIG. 11 is a partially enlarged view of the damper device 100 shown in FIG. 10. The damper device 100 further includes a first seal portion 93, a second seal portion 94, a third seal portion 95, and a fourth seal portion 96 that join the respective members. The base 120 includes a bottom portion 80, an inner wall portion 82a, and an outer wall portion 82b.

The bottom portion 80 of the base 120 is also a bottom portion of the damper device 100, and constitutes a bottom surface of a housing chamber 170. The inner wall portion 82a and the outer wall portion 82b are erected from the bottom portion 80 and face each other. The inner wall portion 82a is located on an inner side of the outer wall portion 82b. The housing chamber 170 is located on an inner side of the inner wall portion 82a, and a reservoir chamber 144 is located between the inner wall portion 82a and the outer wall portion 82b.

The rotor 124 includes a rotation shaft portion 150 and a protruding portion 152. The rotation shaft portion 150 is erected at a center of the rotor 124 and is formed in a columnar shape. The protruding portion 152 protrudes outward in the radial direction from the rotation shaft portion 150 and is housed in the housing chamber 170.

The first cap 122a defines the base 120 and the housing chamber 170. The housing chamber 170 is filled with the viscous liquid 74. The second cap 122b is fixed to the base 120 and suppresses the first cap 122a from coming off. Accordingly, after the first cap 122a closes the housing chamber 170, the second cap 122b can suppress the first cap 122a from coming off while maintaining a state where the housing chamber 170 is closed. Accordingly, an amount of air remaining in the housing chamber 170 can be reduced.

The first cap 122a includes a first annular plate portion 84, a first peripheral wall portion 86, and an engaging portion 88. The first annular plate portion 84 has the insertion hole 60 at a center, and extends outward in the radial direction from the insertion hole 60. The first annular plate portion 84 has an annular rib 84a formed to protrude at an upper surface. The first peripheral wall portion 86 protrudes so as to be suspended from an outer peripheral edge of the first annular plate portion 84, and is formed in a substantially cylindrical shape.

The engaging portion 88 is formed at a tip end portion of the first peripheral wall portion 86, and is engaged with the inner wall portion 82a of the base 120 so as to face the inner wall portion 82a in the axial direction. The engaging portion 88 is located between the housing chamber 170 and the reservoir chamber 144. Accordingly, the housing chamber 170 defined by the base 120 and the first cap 122a is closed.

The engaging portion 88 is formed in a convex shape protruding downward, and a tip end portion of the inner wall portion 82a is formed in a concave shape. Accordingly, the engaging portion 88 and the tip end portion of the inner wall portion 82a can be engaged with each other in a concavo-convex manner, and the base 120 and the first cap 122a can be suppressed from being displaced in the radial direction.

The second cap 122b includes a second annular plate portion 90 and a second peripheral wall portion 92. The second annular plate portion 90 has a central hole 90a and extends outward in the radial direction from the central hole 90a. The second peripheral wall portion 92 protrudes so as to be suspended from a lower surface of the second annular plate portion 90, and is formed in a substantially cylindrical shape. The second peripheral wall portion 92 is located in the middle in a range in the radial direction of the second annular plate portion 90. That is, the second annular plate portion 90 protrudes outward in the radial direction from the second peripheral wall portion 92.

The annular rib 84a enters an inner side of the central hole 90a, and an inner peripheral region of the second annular plate portion 90 overlaps with an outer peripheral region of the first annular plate portion 84 in the axial direction. The second peripheral wall portion 92 is inserted between the inner wall portion 82a and the outer wall portion 82b, and is located on an outer side of the first peripheral wall portion 86 in the radial direction.

The second peripheral wall portion 92 of the second cap 122b has a plurality of ribs 92a on the outer peripheral surface thereof. The plurality of ribs 92a are formed so as to protrude from the outer peripheral surface of the second peripheral wall portion 92, and are formed so as to be separated from each other in the peripheral direction. The ribs 92a are provided in a shape along an inner peripheral surface of the outer wall portion 82b. When the second peripheral wall portion 92 is pushed into a space between the inner wall portion 82a and the outer wall portion 82b, the plurality of ribs 92a abut on the outer wall portion 82b, such that a pushing posture of the second cap 122b is stabilized.

The first seal portion 93, the second seal portion 94, the third seal portion 95, and the fourth seal portion 96 shown in FIG. 11 are formed by welding. In FIGS. 10 and 11, the seal portion of each member is shown in a state of not being melted by welding.

The first seal portion 93 is formed by welding an outer peripheral surface of the first peripheral wall portion 86 of the first cap 122a and an inner peripheral surface of the second peripheral wall portion 92 of the second cap 122b. The first seal portion 93 is located between the housing chamber 170 and the reservoir portion chamber 144 in the radial direction, and fixes the first cap 122a and the second cap 122b. The first seal portion 93 blocks communication between the housing chamber 170 and the outside, and seals leakage of the viscous liquid 74 from the housing chamber 170.

The second seal portion 94 is formed by welding an outer peripheral surface of the inner wall portion 82a of the base 120 and the inner peripheral surface of the second peripheral wall portion 92 of the second cap 122b. The second seal portion 94 is located between the housing chamber 170 and the reservoir chamber 144 in the radial direction, blocks communication between the housing chamber 170 and the reservoir chamber 144, and seals the leakage of the viscous liquid 74 from the housing chamber 170.

The second cap 122b is fixed to the base 120 to seal between the housing chamber 170 and the reservoir chamber 144 by the first seal portion 93 and the second seal portion 94, and is fixed (welded in the embodiment) to the first cap 122a. Accordingly, the first cap 122a has a function of closing the housing chamber 170, and the second cap 122b has a function of fixing the first cap 122a to the base 120.

The first seal portion 93 and the second seal portion 94 are continuous with the engaging portion 88, and are formed continuously in the axial direction on an outer side of the engaging portion 88 in the radial direction. That is, a space between the engaging portion 88 and the inner wall portion 82a is sealed up and down, and the viscous liquid 74 is restricted from moving to the outer side in the radial direction from the space between the engaging portion 88 and the inner wall portion 82a. Further, the second cap 122b is joined to the first cap 122a and the base 120 by welding. By the first seal portion 93 and the second seal portion 94 sealing positions close to the housing chamber 170, it is possible to suppress the viscous liquid 74 injected in advance from being scattered to various places, and to stabilize a sealing amount in the housing chamber 170.

The third seal portion 95 is formed by welding the outer peripheral surface of the second peripheral wall portion 92 and the inner peripheral surface of the outer wall portion 82b. The third seal portion 95 is located on an outer side of the reservoir chamber 144 and seals the leakage of the viscous liquid 74 from the reservoir chamber 144. Further, the third seal portion 95 joins the second cap 122b and the base 120.

The fourth seal portion 96 is formed by welding an outer peripheral surface of the first annular plate portion 84 and the inner peripheral surface of the second peripheral wall portion 92. The fourth seal portion 96 seals the viscous liquid 74 from leaking from a gap between the first cap 122a and the second cap 122b. Further, the fourth seal portion 96 joins the first cap 122a and the second cap 122b.

The first seal portion 93 and the fourth seal portion 96 can double seal the viscous liquid 74 from leaking from the gap between the first cap 122a and the second cap 122b. Further the second seal portion 94 and the third seal portion 95 can double seal the viscous liquid 74 from leaking from a gap between the second cap 122b and the base 120.

Figure 12:
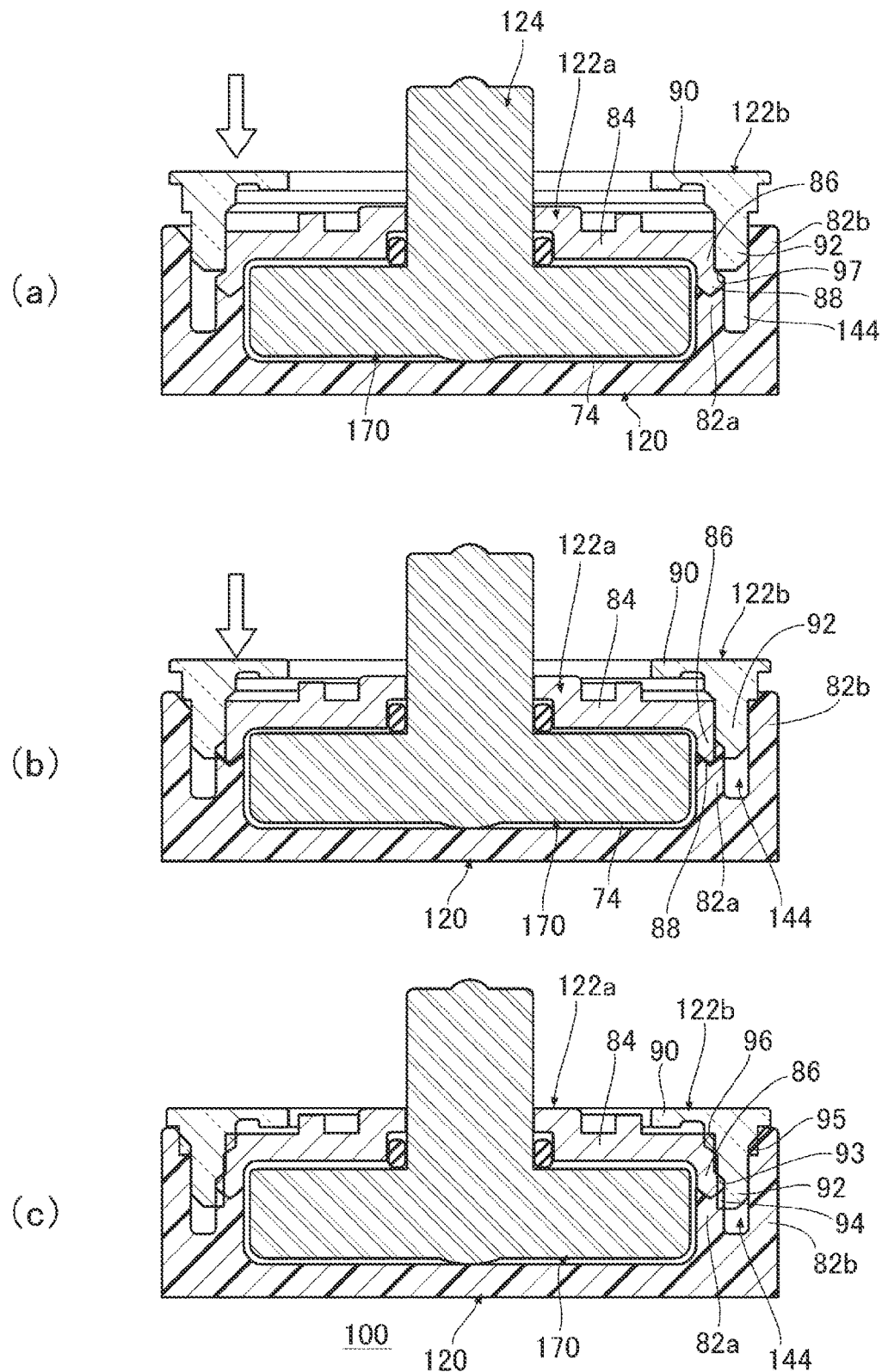
FIG. 12 is a diagram showing an assembly process of the damper device according to the first modification.

FIG. 12 is a diagram showing an assembly process of the damper device 100 according to the first modification. The viscous liquid 74 is placed on a center of the base 120, the rotor 124 is placed on the base 120, and the first cap 122a is pressed from above toward the base 120. Accordingly, the viscous liquid 74 passes through a gap between the engaging portion 88 and the inner wall portion 82a and is pushed to the reservoir chamber 144 side.

Further, the first cap 122a approaches the base 120, and as shown in (a) of FIG. 12, the engaging portion 88 of the first cap 122a is in a state of being engaged with the tip end portion of the inner wall portion 82a of the base 120. By the engagement between the engaging portion 88 and the inner wall portion 82a, the housing chamber 170 is closed, and the movement of the viscous liquid 74 is restricted.

In a state where the housing chamber 170 is closed, a process of welding the second cap 122b is executed. Accordingly, it is possible to suppress the viscous liquid 74 from being compressed in the housing chamber 170 due to the pushing of the second cap 122b. The second cap 122b approaches the base 120 in a state where the second peripheral wall portion 92 is aligned between the inner wall portion 82a and the outer wall portion 82b. A tip end of the second peripheral wall portion 92 comes into contact with an inclined surface 97 formed on the outer peripheral surface of the first annular plate portion 84. The inclined surface 97 is inclined so as to protrude outward in the radial direction toward the lower side, and protrudes outward in the radial direction from the inner peripheral surface of the second peripheral wall portion 92. That is, when the second peripheral wall portion 92 is pushed into an outer periphery of the first annular plate portion 84, the second peripheral wall portion 92 always abuts on the inclined surface 97.

In a state where the second peripheral wall portion 92 comes into contact with the inclined surface 97 of the first annular plate portion 84, the ultrasonic welding device 76 is driven to melt the abutting portion, and the second cap 122b further approaches the base 120.

In (b) of FIG. 12, a state where the second cap 122b is pushed toward the base 120 and where the inner peripheral surface of the second peripheral wall portion 92 and the outer peripheral surface of the first peripheral wall portion 86 are melted is shown, and the first seal portion 93 starts to be generated. Further, the second peripheral wall portion 92 comes into contact with an engaging portion between the engaging portion 88 and the inner wall portion 82a and starts to melt, and the housing chamber 170 is sealed. By melting the engaging portion between the engaging portion 88 and the inner wall portion 82a, it is possible to reliably block the communication between the housing chamber 170 and the reservoir chamber 144.

In (b) of FIG. 12, an inner peripheral surface on a base end side of the second peripheral wall portion 92 comes into contact with the outer peripheral edge of the first annular plate portion 84, and an outer peripheral surface on the base end side of the second peripheral wall portion 92 comes into contact with an inner peripheral edge on a tip end side of the outer wall portion 82b. The contact portion starts to be melted by the ultrasonic welding device 76.

In (c) of FIG. 12, the pushing of the second cap 122b is completed, the first seal portion 93, the second seal portion 94, the third seal portion 95, and the fourth seal portion 96 are formed, and the assembly of the damper device 100 is completed. The first seal portion 93 starts to be formed, then the second seal portion 94 is formed, and then the third seal portion 95 and the fourth seal portion 96 are formed. By starting welding from the first seal portion 93 and the second seal portion 94 first, the housing chamber 170 can be sealed, and then the reservoir chamber 144 can be sealed. Welding start timings of the second seal portion 94, the third seal portion 95, and the fourth seal portion 96 may be the same.

Figure 13:
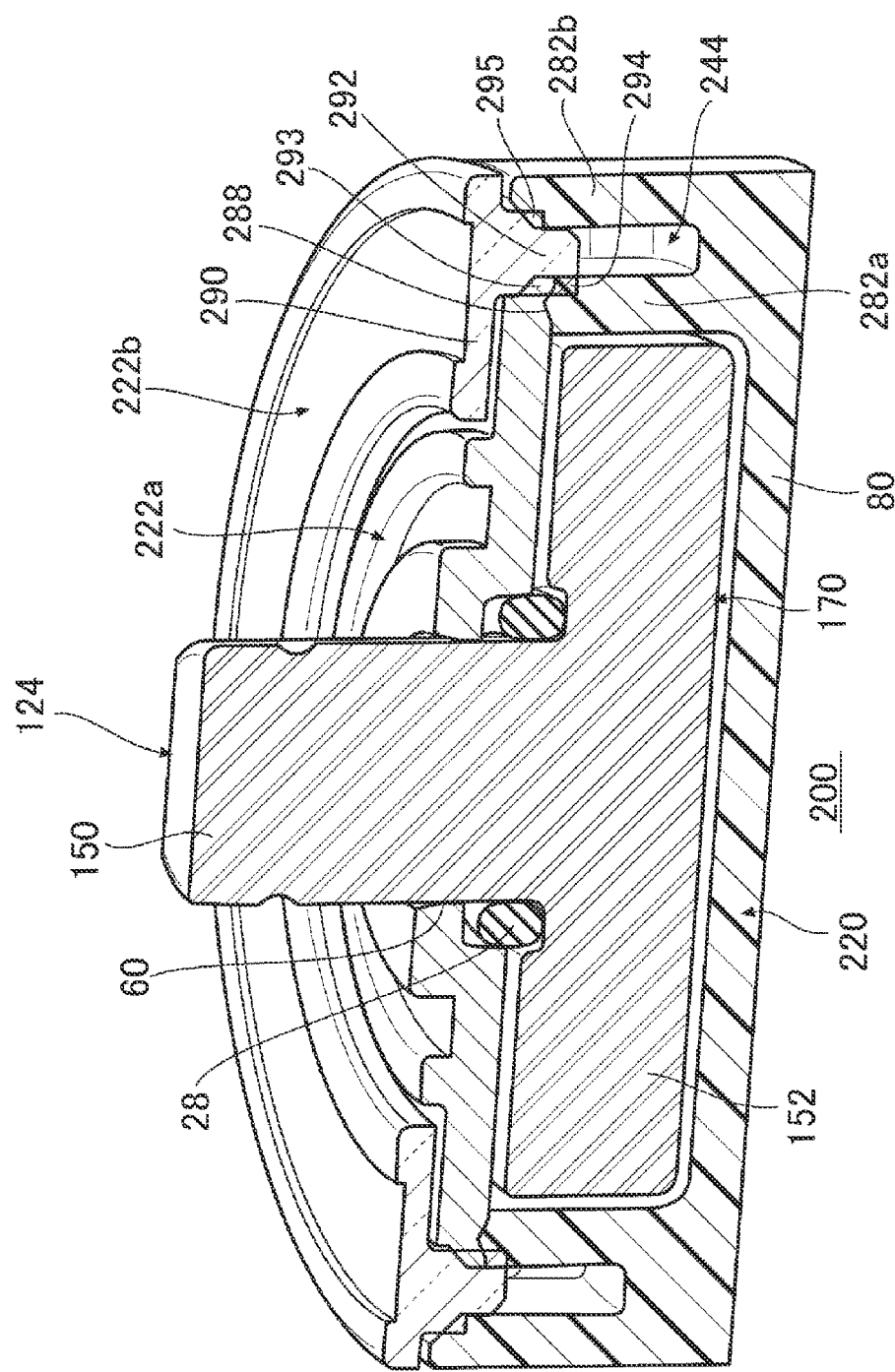
FIG. 13 is a perspective cross-sectional view of a damper device according to a second modification.
Figure 14:
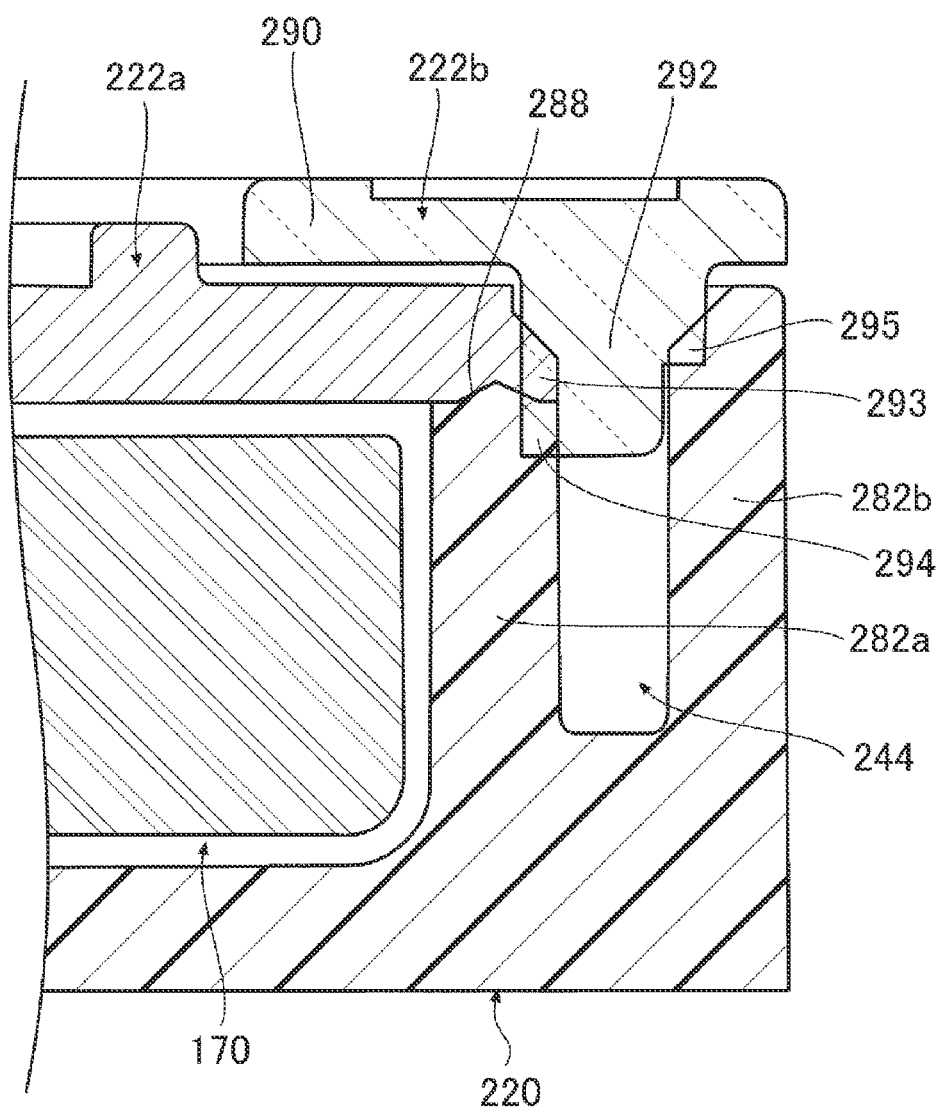
FIG. 14 is a partially enlarged view of the damper device shown in FIG. 13.

FIG. 13 is a perspective cross-sectional view of a damper device 200 according to a second modification. Further, FIG. 14 is a partially enlarged view of the damper device 200 shown in FIG. 13. In the damper device 200 of the second modification, positions of a first seal portion 293 and a second seal portion 294 are different from those of the damper device 100 of the first modification shown in FIG. 10, and the first seal portion 293 and the second seal portion 294 are located above the first seal portion 93 and the second seal portion 94 of the damper device 100.

The damper device 200 includes a base 220, a first cap 222a, a second cap 222b, the rotor 124, the first seal portion 293, the second seal portion 294, and a third seal portion 295. The base 220 includes the bottom portion 80, an inner wall portion 282a, and an outer wall portion 282b.

The inner wall portion 282a and the outer wall portion 282b are erected from the bottom portion 80 and face each other. The inner wall portion 282a is located on an inner side of the outer wall portion 282b. The housing chamber 170 is located on an inner side of the inner wall portion 282a, and a reservoir chamber 244 is located between the inner wall portion 282a and the outer wall portion 282b. The inner wall portion 282a is erected so as to cover an outer periphery of the housing chamber 170, and is erected above the protruding portion 152. By forming the inner wall portion 282a to be high, it is possible to increase a size of the reservoir chamber 244.

The first cap 222a is formed in a substantially disc shape, and has the insertion hole 60 at a center thereof. An engaging portion 288 of the first cap 222a is formed on a lower surface on an outer peripheral side, and engages with an inner wall portion 282a of the base 220 so as to face the inner wall portion 282a in the axial direction.

The second cap 222b includes a second annular plate portion 290 and a peripheral wall portion 292. The second annular plate portion 290 extends outward in the radial direction. The peripheral wall portion 292 protrudes so as to be suspended from a lower surface of the second annular plate portion 290, and is formed in a substantially cylindrical shape.

Figure 15:
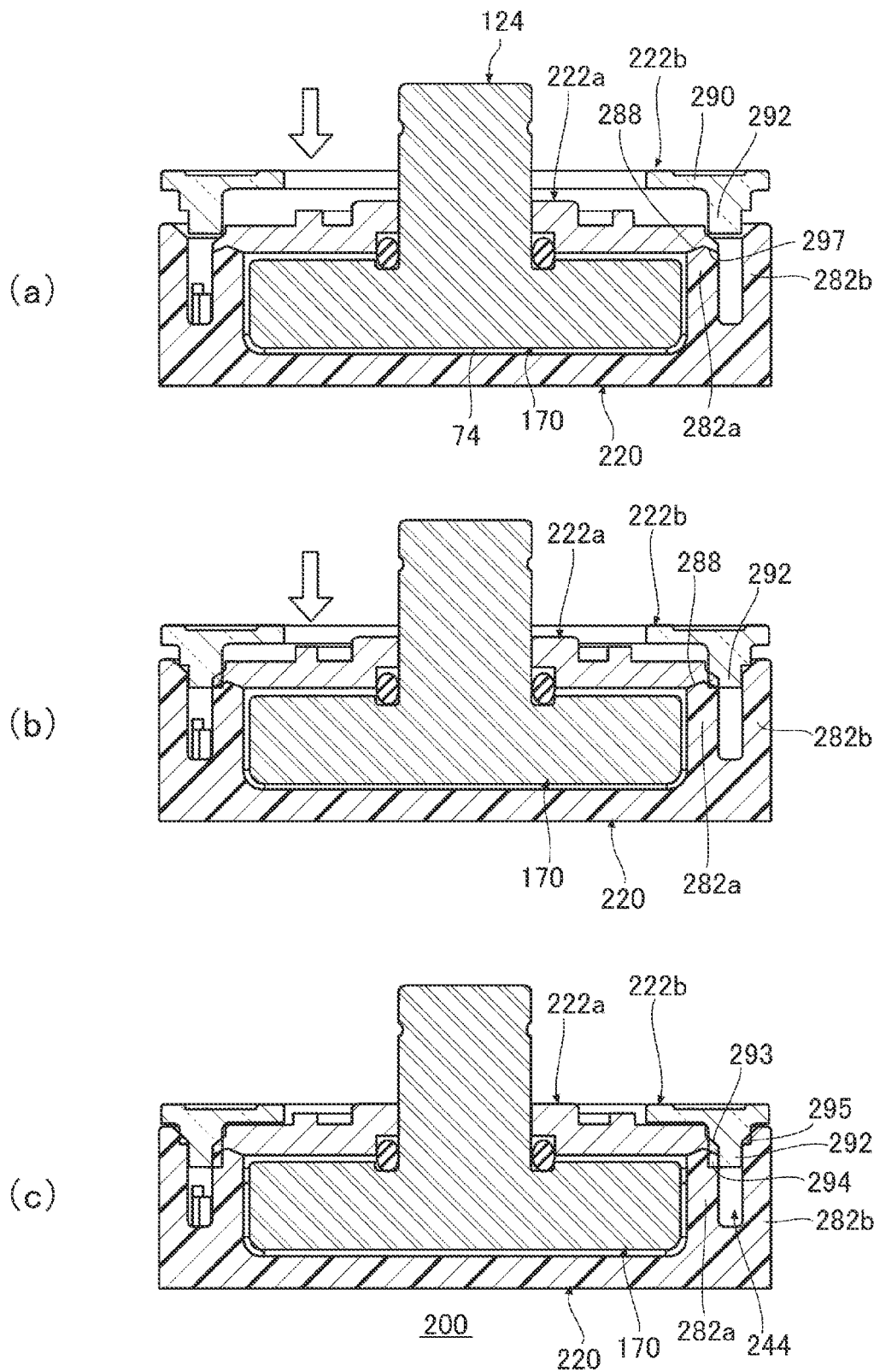
FIG. 15 is a diagram showing an assembly process of the damper device according to the second modification.

FIG. 15 is a diagram showing an assembly process of the damper device 200 according to the second modification. As shown in (a) of FIG. 15, the engaging portion 288 of the first cap 222a is in a state of being engaged with a tip end portion of the inner wall portion 282a of the base 220, and in a state where the housing chamber 170 is closed, a process of welding the second cap 222b is executed. Accordingly, it is possible to suppress the viscous liquid 74 from being compressed in the housing chamber 170 due to the pushing of the second cap 222b.

The second cap 222b approaches the base 220 in a state where the peripheral wall portion 292 is aligned between the inner wall portion 282a and the outer wall portion 282b. A tip end of the peripheral wall portion 292 comes into contact with an inclined surface 297 formed on an outer peripheral surface of the first cap 222a. An abutting portion is melted by the ultrasonic welding device 76.

In (b) of FIG. 15, a state where the second cap 222b is pushed toward the base 220 and where an inner peripheral surface of the peripheral wall portion 292 and the outer peripheral surface of the first cap 222a are melted is shown, and the first seal portion 293 starts to be formed. Further, the peripheral wall portion 292 comes into contact with an engaging portion between the engaging portion 288 and the inner wall portion 282a and starts to melt, and the housing chamber 170 is sealed.

In (b) of FIG. 15, an outer peripheral surface on a base end side of the peripheral wall portion 292 comes into contact with an inner peripheral edge on a tip end side of the outer wall portion 282b. In (c) of FIG. 15, the pushing of the second cap 222b is completed, the first seal portion 293, the second seal portion 294, and the third seal portion 295 are formed, and the assembly of the damper device 200 is completed. By starting welding from the first seal portion 293 and the second seal portion 294 first, the housing chamber 170 can be sealed, and then the reservoir chamber 244 can be sealed.

The present invention is not limited to the embodiment described above and modifications such as various design changes can be added to the embodiment based on knowledge of a person skilled in the art. Embodiments to which such modifications are added can also be included in the scope of the present invention.

In the embodiment, an aspect in which the fixed body or the opening and closing body is coupled to the tooth portions 40 formed on the base 20 is shown, but the present invention is not limited to this aspect. For example, a flange plate-shaped mounting portion having a screw hole may be formed. In any case, when the coupling gear 26 is coupled to the opening and closing body, the base 20 is coupled to the fixed body in a state where the rotation is restricted.

Further, in the embodiment, an aspect in which the first seal portion 46 and the second seal portion 48 are formed by welding is shown, but the present invention is not limited to this aspect. For example, the second seal portion 48 may be formed by adhesion or mechanical coupling, and the first seal portion 46 may be formed by mechanical coupling, for example, using a seal ring. Further, without limiting to the ultrasonic welding, welding of other method such as vibration welding or laser welding may be used for formation of the first seal portion 46 and the second seal portion 48. Further, the first seal portion 93, the second seal portion 94, the third seal portion 95, and the fourth seal portion 96 are not limited to being formed by welding similarly to the first seal portion 46 and the second seal portion 48, and may be formed by adhesion or mechanical coupling. In any case, these seal portions fix the members to each other to restrict the movement of the viscous liquid 74. That is, the fixing includes welding, adhesion, and the like.

Further, in the embodiment, an aspect in which the base inclined surface 34 and the cap inclined surface 64 are parallel to the inclined portion 52 of the rotor 24 is shown, but the present invention is not limited to this aspect, the base inclined surface 34 and the cap inclined surface 64 may not be parallel to the inclined portion 52. In any case, the base inclined surface 34, the cap inclined surface 64, and the inclined portion 52 are inclined so as to rise outward in the radial direction, are inclined with respect to a plane orthogonal to the rotation shaft portion 50, and guide the viscous liquid 74 to the reservoir chamber 44.

INDUSTRIAL APPLICABILITY

The present invention relates to a damper device filled with viscous liquid.

REFERENCE SIGNS LIST

10: damper device
20: base

22: cap
24: rotor
26: coupling gear
28: seal ring
30: peripheral wall portion
30a: inner wall portion
30h: outer wall portion
32: recessed portion
34: base inclined surface
36: annular groove portion
38: annular recessed portion
40: tooth portion
42: coupling hole portion
44: reservoir chamber
46: first seal portion
48: second seal portion
50: rotation shaft portion
52: inclined portion.
54: through hole portion
56: annular wall portion
58: protruding portion
60: insertion hole
62: outer peripheral wall portion
64: cap inclined surface
66: inner peripheral groove portion
68: coupling hole
70: housing chamber
72: discharge device
74: viscous liquid
76: ultrasonic welding device
88: engaging portion
93: first seal portion
94: second seal portion
122a: first cap
122b: second cap

The invention claimed is:

1. A damper device, comprising:
a base;
a rotor rotatably supported by the base;
a cap defining a housing chamber of the rotor together with the base; and
viscous liquid filled in the housing chamber, wherein
the base and the cap define a reservoir chamber for the viscous liquid on an outer side of the housing chamber in a radial direction,
the cap is fixed to the base to seal between the housing chamber and the reservoir chamber, so that a communication between the housing chamber and the reservoir chamber is blocked, and
the reservoir chamber houses the viscous liquid discharged from the housing chamber.

2. The damper device according to claim 1, wherein
the reservoir chamber is closed by a seal of the base and the cap on an outer side of the reservoir chamber in the radial direction, and
the seal on the outer side of the reservoir chamber in the radial direction has a seal margin in an axial direction larger than that of a seal between the housing chamber and the reservoir chamber.

3. The damper device, comprising: according to claim 1, wherein
the cap includes:
a first cap defining the housing chamber with the base; and
a second cap that is fixed to the base and that is configured to suppress the first cap from coming off.

4. The damper device according to claim 3, wherein
the first cap includes an engaging portion that is engaged with the base so as to face the base in an axial direction, and
the engaging portion is located between the housing chamber and the reservoir chamber.

5. The damper device according to claim 4, further comprising:
a first seal portion formed by fixing the second cap and the first cap to each other on an outer side of the engaging portion in the radial direction; and
a second seal portion formed by fixing the second cap and the base to each other on the outer side of the engaging portion in the radial direction, wherein
the first seal portion and the second seal portion are formed continuously in the axial direction.

6. The damper device according to claim 3, wherein
the second cap is fixed to and seals the base between the housing chamber and the reservoir chamber, and is fixed to the first cap.

* * * * *